US009953618B2

(12) United States Patent
Ramachandran et al.

(10) Patent No.: US 9,953,618 B2
(45) Date of Patent: Apr. 24, 2018

(54) USING A PLURALITY OF SENSORS FOR MAPPING AND LOCALIZATION

(71) Applicant: QUALCOMM Incorporated, San Diego, CA (US)

(72) Inventors: Mahesh Ramachandran, San Diego, CA (US); Ashwin Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 13/834,207

(22) Filed: Mar. 15, 2013

(65) Prior Publication Data

US 2014/0125700 A1 May 8, 2014

Related U.S. Application Data

(60) Provisional application No. 61/721,893, filed on Nov. 2, 2012.

(51) Int. Cl.
*G09G 5/377* (2006.01)
*G06T 7/55* (2017.01)

(52) U.S. Cl.
CPC .............. *G09G 5/377* (2013.01); *G06T 7/55* (2017.01); *G06T 2200/04* (2013.01);
(Continued)

(58) Field of Classification Search
CPC ......... G06T 19/006; G06T 2207/30244; G06T 7/004; G06T 2200/04; G06T 2200/08;
(Continued)

(56) References Cited

U.S. PATENT DOCUMENTS 8,259,994 B1  9/2012 Anguelov et al.
8,649,565 B1 * 2/2014 Kim et al. .................... 382/106
(Continued)

FOREIGN PATENT DOCUMENTS

CN  102122392 A  7/2011
CN  102236520 A  11/2011
(Continued)

OTHER PUBLICATIONS

Second Written Opinion for International Application No. PCT/US2013/061401, dated Sep. 18, 2014, 7 pgs.
(Continued)

*Primary Examiner* — Ke Xiao
*Assistant Examiner* — Kim-Thanh T Tran
(74) *Attorney, Agent, or Firm* — Hunter Clark

(57) ABSTRACT

Systems and methods for performing localization and mapping with a mobile device are disclosed. In one embodiment, a method for performing localization and mapping with a mobile device includes identifying geometric constraints associated with a current area at which the mobile device is located, obtaining at least one image of the current area captured by at least a first camera of the mobile device, obtaining data associated with the current area via at least one of a second camera of the mobile device or a sensor of the mobile device, and performing localization and mapping for the current area by applying the geometric constraints and the data associated with the current area to the at least one image.

32 Claims, 8 Drawing Sheets

(52) U.S. Cl.
CPC ............... *G06T 2200/08* (2013.01); *G06T 2207/10016* (2013.01); *G06T 2207/30244* (2013.01)

(58) Field of Classification Search
CPC ............ G06T 2207/10016; G06T 7/55; G09G 2320/0261; G09G 5/377
USPC .................................................. 345/633, 632
See application file for complete search history.

(56) References Cited

U.S. PATENT DOCUMENTS

| | | | |
|---|---|---|---|
| 2005/0110621 A1* | 5/2005 | Hahn ..................... B60R 1/00 340/435 |
| 2005/0238200 A1 | 10/2005 | Gupta et al. |
| 2010/0086174 A1 | 4/2010 | Kmiecik et al. |
| 2010/0208057 A1* | 8/2010 | Meier ................... G06T 7/0046 348/135 |
| 2011/0037712 A1* | 2/2011 | Kim ..................... H04M 1/7253 345/173 |
| 2011/0242134 A1* | 10/2011 | Miller et al. .................. 345/633 |
| 2011/0273473 A1 | 11/2011 | Kim |
| 2011/0285622 A1 | 11/2011 | Marti et al. |
| 2012/0075484 A1* | 3/2012 | Kawamoto et al. ....... 348/207.1 |
| 2012/0086727 A1* | 4/2012 | Korah et al. .................. 345/633 |
| 2012/0106828 A1* | 5/2012 | Yoon ................... G06K 9/00664 382/153 |
| 2012/0154619 A1 | 6/2012 | Lee |
| 2012/0195460 A1 | 8/2012 | Lawrence |
| 2013/0050432 A1* | 2/2013 | Perez ................. H04N 13/0278 348/47 |
| 2013/0050499 A1* | 2/2013 | Siklossy et al. ............. 348/169 |
| 2013/0147837 A1* | 6/2013 | Stroila .................. G06T 19/006 345/633 |
| 2013/0215230 A1* | 8/2013 | Miesnieks et al. ............. 348/46 |

FOREIGN PATENT DOCUMENTS

| | | |
|---|---|---|
| CN | 102238282 A | 11/2011 |
| CN | 102238466 A | 11/2011 |
| CN | 102281348 A | 12/2011 |
| CN | 102289564 A | 12/2011 |
| CN | 102395997 A | 3/2012 |
| JP | 2010134649 A | 6/2010 |
| JP | 2012123546 A | 6/2012 |
| JP | 2012221250 A | 11/2012 |
| WO | 2012049674 A2 | 4/2012 |

OTHER PUBLICATIONS

Langlotz, et al., "Online Creation of Panoramic Augmented-Reality Annotations on Mobile Phones", IEEE Pervasive Computing 2012, pp. 56-63.

Lee, et al., "Geometric reasoning for single image structure recovery," IEEE Conference on Computer Vision and Pattern Recognition, 2009. CVPR 2009., pp. 2136-2143.

Reitmayr, et al., "Simultaneous Localization and Mapping for Augmented Reality", International Symposium on Ubiquitous Virtual Reality, 2010, pp. 5-8.

International Search Report and Written Opinion—PCT/US2013/061401—ISA/EPO—dated Dec. 16, 2013.

Kahn S., et al., "Beyond 3D As-Built Information Using Mobile AR Enhancing the Building Lifecycle Management", 2012 International Conference on Cyberworlds (CW), IEEE, Sep. 25, 2012, pp. 29-36, DOI: 10.11 09/CW.2012.12, ISBN: 978-1-4673-2736-7.

Zhu Z., et al., "High-precision localization using visual landmarks fused with range data", IEEE Conference on Computer Vision and Pattern Recognition (CVPR), 2011, IEEE, Jun. 20, 2011, pp. 81-88, DOI: 10.1109/CVPR.2011.5995463, ISBN: 978-1-4577-0394-2.

International Preliminary Report on Patentability—PCT/US2013/061401, The International Bureau of WIPO—Geneva, Switzerland, Dec. 12, 2014, 33 pgs.

* cited by examiner

USING A PLURALITY OF SENSORS FOR MAPPING AND LOCALIZATION

CROSS-REFERENCE TO RELATED APPLICATIONS

This application claims the benefit of U.S. Provisional Application No. 61/721,893, filed on Nov. 2, 2012, which is expressly incorporated herein by reference in its entirety.

FIELD

The present disclosure relates to the field of performing localization and mapping.

BACKGROUND

Augmented Reality (AR) provides a view of a real-world environment that is augmented with computer-generated audio and/or visual content. The audio and/or visual content can be overlaid over or integrated into an image or video of the real-world environment captured using a camera of a mobile device. For example, an augmented reality application may be implemented on a mobile phone or tablet computer that includes a camera that can be used to capture images or video of a view of the real-world and a display that can be used to display an augmented view of the real-world environment.

The device can include one or more sensors that collect data that can be used to determine the position, orientation, speed, and/or direction of movement of the device. This information can be used to assist the device in generating augmentation content. The sensors can also be used to collect input information from a user, such as a touch on a touchscreen or other input information that can be used to allow the user to navigate the augmented content displayed on the device.

SUMMARY

Systems and methods for performing localization and mapping for a mobile device are described. An example of a method of performing localization and mapping for a mobile device according to the disclosure includes identifying geometric constraints associated with a current area at which the mobile device is located, obtaining at least one image of the current area captured by at least a first camera of the mobile device, obtaining data associated with the current area via at least one of a second camera of the mobile device or a sensor of the mobile device, and performing localization and mapping for the current area by applying the geometric constraints and the data associated with the current area to the at least one image.

Implementations of the method may include one or more of the following features. The at least one image includes a first image captured by the first camera of the mobile device and a second image of the current area captured by the second camera of the mobile device. Obtaining the data associated with the current area includes evaluating the first image and the second image, and designating either the first image or the second image as a primary image and the other of the first image and the second image as a secondary image based on the evaluating. Obtaining the data associated with the current area further includes computing a pose of the mobile device relative to an environment in which the mobile device is located based on the primary image or at least one other image captured via the first camera. Performing the localization and mapping includes extracting first image features from the primary image, extracting second image features from the secondary image using the pose of the mobile device relative to the environment in which the mobile device is located, and performing localization and mapping for the current area based on the first image features and the second image features. Evaluating can include evaluating the first image and the second image with respect to at least one of features within the first image and the second image or image quality of the first image and the second image. The first camera can be a front-facing camera and the second camera can be a side-facing camera or a rear-facing camera. Obtaining the data associated with the current area can include collecting data from an orientation sensor at the mobile device. Performing the localization and mapping can include estimating an orientation of the mobile device based on the data collected from the orientation sensor. Performing the localization and mapping further comprises extracting features from the at least one image in relation to the orientation of the mobile device by applying the geometric constraints to the features extracted from the at least one image. Performing at least one of mapping or tracking of the features extracted from the at least one image based on the geometric constraints and the orientation of the mobile device. Identifying surfaces within the at least one image based on the geometric constraints and the orientation of the mobile device, the surfaces comprising at least one of horizontal surfaces or vertical surfaces, rendering the at least one image for display on a display screen, and rendering an augmentation on the display screen over at least one of the surfaces identified within the at least one image.

An example of a mobile device operable to perform localization and mapping according to the disclosure includes a tracking module configured to identify geometric constraints associated with a current area at which the device is located, at least one camera communicatively coupled to the tracking module and configured to capture at least one image of the current area, at least one device sensor communicatively coupled to the tracking module and configured to obtain data associated with the current area, the at least one device sensor comprising at least one of a camera or an orientation sensor, and a simultaneous localization and mapping (SLAM) subsystem communicatively coupled to the tracking module and configured to perform localization and mapping for the current area at least in part by applying the geometric constraints and the data associated with the current area to the at least one image.

Implementations of the mobile device may include one or more of the following features. The at least one camera can include a first camera and a second camera; and the at least one image can include a first image captured by the first camera and a second image captured by the second camera. A camera image evaluator communicatively coupled to the first camera and the second camera and configured to evaluate the first image and the second image and to designate either the first image or the second image as a primary image and the other of the first image and the second image as a secondary image based on the evaluation. The tracking module is further configured to compute a pose of the device relative to an environment in which the device is located based on the primary image or at least one other image captured via the first camera. The SLAM subsystem is further configured to extract first image features from the primary image, to extract second image features from the secondary image using the pose of the device relative to the environment in which the device is located, and to perform localization and mapping for the current area based on the first image features and the second image features. The camera image evaluator is further configured to evaluate the first image and the second image with respect to at least one of features within the first image and the second image or image quality of the first image and the second image. The first camera can be a front-facing camera and the second camera can be a side-facing camera or a rear-facing camera. The orientation sensor can be configured to generate data relating to orientation of the device. The tracking module can include a pose estimation module configured to estimate the orientation of the device based on the data generated by the orientation sensor. The SLAM subsystem is configured to extract features from the at least one image in relation to the orientation of the device at least in part by applying the geometric constraints to the features extracted from the at least one image. The SLAM subsystem is further configured to identify surfaces within the at least one image based on the geometric constraints and the orientation of the device, the surfaces comprising at least one of horizontal surfaces or vertical surfaces, and the device can include a display screen and a graphics processor configured to render the at least one image for display on the display screen and to render an augmentation on the display screen over at least one of the surfaces identified within the at least one image.

An example of an apparatus that facilitates performing localization and mapping for a mobile device according to the disclosure includes means for identifying geometric constraints associated with a current area at which the mobile device is located, means for obtaining at least one image of the current area captured by at least a first camera of the mobile device, means for obtaining data associated with the current area via at least one of a second camera of the mobile device or a sensor of the mobile device, and means for performing localization and mapping for the current area by applying the geometric constraints and the data associated with the current area to the at least one image.

An example of a method for tracking elements of a scene according to the disclosure includes tracking elements of a scene or environment with respect to a device based on one or more images of at least a portion of the scene or environment captured at a camera of the device, information or data from one or more additional sensors associated with the device, and one or more constraints of the scene or environment.

Implementations of the method may include one or more of the following features. The one or more constraints comprise a priori knowledge about the scene. The a priori scene knowledge can include an approximate orientation of one or more planes in the scene or environment. The one or more constraints can be estimated. The one or more additional sensors can include a second camera. The one or more additional sensors can include an inertial sensor. The one or more additional sensors can include at least one of an accelerometer, a gyroscope, a compass, a magnetometer, or a pressure sensor.

An example of a method according to the disclosure includes performing simultaneous localization and mapping (SLAM) using images captured at more than one camera coupled to a mobile device. Implementations of the method may include one or more of the following features. A field of view of at least two of the cameras does not substantially overlap. The fields of view of the at least two of the cameras are pointed in opposite directions. The fields of view of the at least two of the cameras are substantially perpendicular. The images can be captured at the cameras substantially simultaneously. At least two of the images are captured at two or more of the cameras during different moments in time.

An example of a method according to the disclosure includes performing localization of a device within a scene or environment, or mapping at least a portion of the scene or environment, based on one or more images of at least the portion of the scene or environment captured at a camera of the device, information or data from one or more additional sensors associated with the device, and one or more constraints of the scene or environment. The one or more additional sensors can include at least one of a second camera, an accelerometer, a gyroscope, a compass, a magnetometer, and a pressure sensor, or any combination thereof.

An example of a non-transitory computer storage medium comprising processor-executable instructions configured to cause a processor to identify geometric constraints associated with a current area at which the mobile device is located, obtain at least one image of the current area captured by at least a first camera of the mobile device, obtain data associated with the current area via at least one of a second camera of the mobile device or a sensor of the mobile device, and perform localization and mapping for the current area by applying the geometric constraints and the data associated with the current area to the at least one image.

An example of a method according to the disclosure includes tracking elements of a scene or environment with respect to a device based on one or more images of at least a portion of the scene or environment captured at a camera of the device, information or data from one or more additional sensors associated with the device, and one or more constraints of the scene or environment.

Implementations of the method may include one or more of the following features. One or more constraints include a priori scene knowledge. The a priori scene knowledge comprises an approximate orientation of one or more planes in the scene or environment. One or more of the constraints may be estimated. The one or more additional sensors may be a second camera, an inertial sensor, an accelerometer, a gyroscope, a compass, a magnetometer, or a pressure sensor.

An example of a method according to the disclosure includes performing simultaneous localization and mapping (SLAM) using images captured at two or more cameras coupled to a mobile device. Implementations of the method may include one or more of the following features. A field of view of at least two of the cameras does not substantially overlap. The fields of view of the at least two of the cameras can be pointed in opposite directions. The fields of view of the at least two of the cameras are substantially perpendicular. The images are captured at the plurality of cameras substantially simultaneously. The images are captured at two or more of the cameras during different moments in time.

An example of a method according to the disclosure includes performing localization of a device within a scene or environment, or mapping at least a portion of the scene or environment, based on one or more images of at least the portion of the scene or environment captured at a camera of the device, information or data from one or more additional sensors associated with the device, and one or more constraints of the scene or environment. Implementations of the method may include one or more of the following features. The one or more additional sensors can include a second camera, an accelerometer, a gyroscope, a compass, a magnetometer, and a pressure sensor, or any combination thereof.

Items and/or techniques described herein may provide one or more of the following capabilities, as well as other capabilities not mentioned. Geometric constraints can be stored in and/or accessible to a mobile device. Images of an area can be obtained with a front-facing and/or a back-facing camera. Orientation sensors on the mobile device can be used to obtain orientation information. The geometric constraints and orientation information can be used in the localization and mapping of an area. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for performing localization and mapping, e.g., simultaneous localization and mapping (SLAM). The various example implementations illustrated herein can be implemented on an augmented reality (AR)-enabled device. The AR-enabled device can be a mobile device (e.g., phone), tablet computer, head mounted display, or other such device, or any other suitable device presently existing or existing in the future. In general, an AR-enabled device includes a processor for executing non-transitory, machine-readable, machine-executable instructions, a camera for capturing images or video of a real-world environment, and a display for displaying an augmented reality view of the real-world environment. In some embodiments, methods of performing localization and mapping described herein may be implemented in a robotic device, for example in an autonomous robot configured to navigate without intervention.

The techniques described herein can be integrated in a wide variety of AR applications to create a more satisfying and engaging user experience than conventional AR applications. The described techniques can be performed by an AR-enabled device in software (e.g., via a processor executing processor-executable code stored on a memory or machine-readable storage medium), hardware, or a combination of hardware and software. Further, at least some of the techniques described herein may be performed by one or more devices distinct from the AR-enabled device. For instance, an AR-enabled device may communicate with a server or other network device to facilitate at least some of the operations described herein. Other implementations are also possible.

Figure 1:
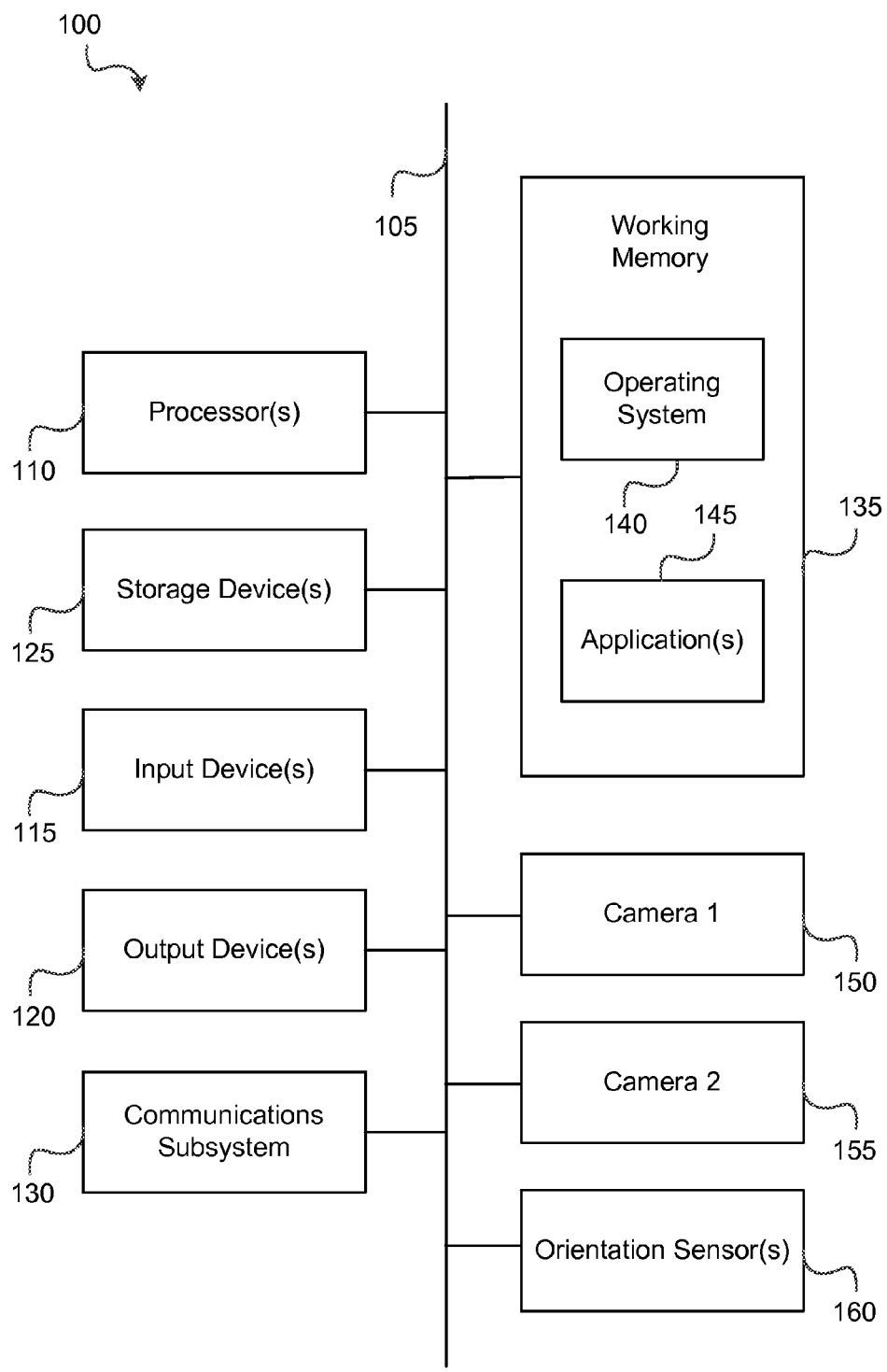
FIG. 1 illustrates an example of a computer system that incorporates components of a mobile device.

FIG. 1 illustrates an example of a computer system 100 that incorporates components of an AR-enabled device for implementing at least part of the functionality described herein. A computer system as illustrated in FIG. 1 may be incorporated as part of the computerized devices described below. For example, computer system 100 can represent some of the components of a mobile device or a smartphone. A mobile device may be any computing device with an input sensory unit, such as a camera 150, 155, and may also include a display unit. Examples of a mobile device include but are not limited to video game consoles, tablets, smart phones and any other hand-held devices. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown including hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation one or more cameras, sensors (including inertial sensors), a mouse, a keyboard and/or the like; and one or more output devices 120, which can include without limitation a display unit. In addition to the input device(s) 115, computer system 100 may include one or more cameras, such as a first camera 150 and a second camera 155. The computer system 100 may additionally or alternatively include one or more orientation sensors 160, such as inertial sensors (accelerometers, gyroscopes, etc.), magnetic sensors such as a compass or magnetometer, etc. While not shown in FIG. 1, the computer system 100 may also utilize one or more additional sensors such as pressure sensors, temperature sensors, etc. Furthermore, in some embodiments an input/output device may be integrated, for example in a touch screen or capacitive display.

The computer system 100 may further include (and/or be in communication with) one or more non-transitory storage devices 125, which can include, without limitation, local and/or network accessible storage, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 100 may also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), or the like. The communications subsystem 130 may permit data to be exchanged with a network, other computer systems, and/or any other devices described herein. The computer system 100 may also include a non-transitory working memory 135, which can include a RAM or ROM device, as described above.

The computer system 100 also includes software elements, shown as being currently located within the working memory 135. These software elements include an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 125 described above. In some cases, the storage medium may be incorporated within a computer system, such as computer system 100. In other cases, the storage medium may be separate from a computer system (e.g., a removable medium, such as a compact disc), and/or provided in an installation package, such that the storage medium can be used to program, configure and/or adapt a general purpose computer with the instructions/code stored thereon. These instructions may take the form of executable code, which is executable by the computer system 100, or alternatively the instructions may take the form of source and/or installable code, which, upon compilation and/or installation on the computer system 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 100) to perform methods in accordance with the disclosure. For example, some or all of the procedures of the described methods may be performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks, such as the storage device(s) 125. Volatile media include, without limitation, dynamic memory, such as the working memory 135. Alternatively, the computer system 100 may utilize transmission media, which includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then carries the signals (and/or the data, instructions, etc. carried by the signals) to the working memory 135, from which the processor(s) 110 retrieves and executes the instructions. The instructions received by the working memory 135 may optionally be stored on a non-transitory storage device 125 either before or after execution by the processor(s) 110.

Figure 2:
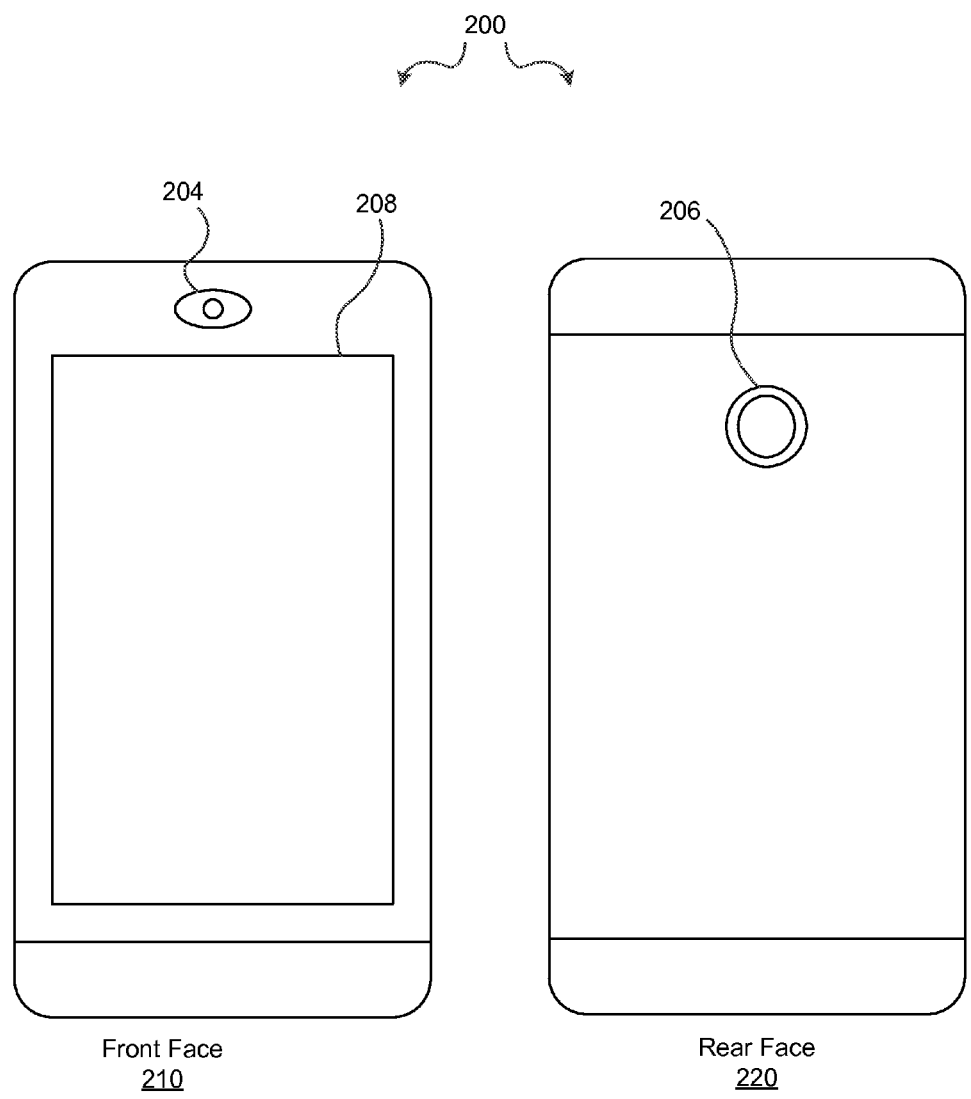
FIG. 2 is a diagram of a device that is operable to perform functions as described herein.

FIG. 2 is an illustration of a device 200 operable to perform functions described herein. FIG. 2 may represent a mobile device such as a smart phone using one or more components of the computer system of FIG. 1. However, the functionality described herein is not limited to using smart phones and may use any device with capabilities similar to FIG. 1 and suitable for performing such functionality. These devices may include mobile devices, digital cameras, camcorders, tablets, PDAs or any other similar device. FIG. 2 illustrates a front face 210 and back face 220 of the device 200. The front face 210 includes a display 208 and a first camera 204. The display 208 may be an output device 120, as discussed with reference to FIG. 1. The first camera 204 coupled to the front-facing side of the device 200 is also referred to as a front-facing camera. The rear face 220 of the device 200 includes a second camera 206, also referred to herein as a rear-facing camera. The device 200 may be held such that the front-facing camera 204 faces the user of the device 200 and the rear-facing camera 206 faces away from the user of the device. Alternatively, the converse may be true depending on how the device 200 is held by the user. Both the front-facing camera 204 and the rear-facing camera 206 may be an implementation of an input device 115 or may be implemented as a first camera 150 and a second camera 155, respectively, as discussed with reference to FIG. 1. Both the front-facing camera 204 and the rear-facing camera 206 may include multiple cameras such that field of views of at least two of cameras do not overlap. In some embodiments, one or more stereo cameras may be used.

In an embodiment, the device 200 includes a system architecture that can be used to enable AR functionality. For example, an AR-enabled device architecture may also be used to implement the general purpose computing system 100 shown in FIG. 1, and may include additional sensors and detectors as input devices 115 and/or orientation sensor(s) 160. An AR-enabled device can include sensors such as gyros, accelerometers, magnetometers, an inertial measurement unit (IMU) and/or other types of sensors. The device 200 may also include a sensor processor for processing data collected by the sensors. The AR-enabled device also includes a camera processor configured to receive input from the cameras 150, 155. The cameras 150, 155 can be configured to capture images and/or video of a real-world scene that can be augmented using the augmentation logic described herein. The camera processor can be configured to process the data collected by one or more of the cameras 150, 155 and to convert the data collected by the camera into a format that can be used by the augmentation logic. The camera processor can be configured to perform various types of image or video processing on the data collected from the camera to prepare the content for display on display 208 (i.e., an output device 120).

The display 208 can be a touch screen interface that includes a touch sensor. A graphics processor can be used to generate graphical data for display on display 208. The augmentation logic can be configured to send commands to the graphics processor to display augmented image or video content. The device 200 can include a touch sensor processor configured to process data output by the touch sensor to identify when a user touches the touch screen. The touch sensor processor can be configured to identify various touch gestures, including multi-finger touches of the touch screen. The augmentation logic can use the gestures determined by the touch sensor processor to determine, at least in part, how the augmentation should react in response to user input. The device 200 can include a communications controller configured to enable the device 200 to communicate using one more wireless protocols. The communications controller can be configured to allow the device to send and receive data from nearby wireless devices, including wireless access point and other AR-enabled devices. The memory 135 includes volatile and/or persistent memory for storing data used by various components of the AR-enabled device. The memory 135 can be used to store processor-executable program code for one or more of the processors included in the device. In some instances, the augmentation logic can be implemented as processor-executable instructions stored in the memory 135.

Those of skill in the art will appreciate that certain illustrated elements having a similar semantic description or name to elements illustrated in another figure may be commonly implemented or separately implemented. For example, the sensors may comprise and/or be used to implement any of orientation sensors 160, inertial sensors, magnetometer, pressure sensor, and/or orientation sensors. Similarly, camera may comprise and/or be used to implement any of cameras 150, 155, and the display 208 shown in FIG. 2 may comprise and/or be used to implement the touch sensor.

Figure 3:
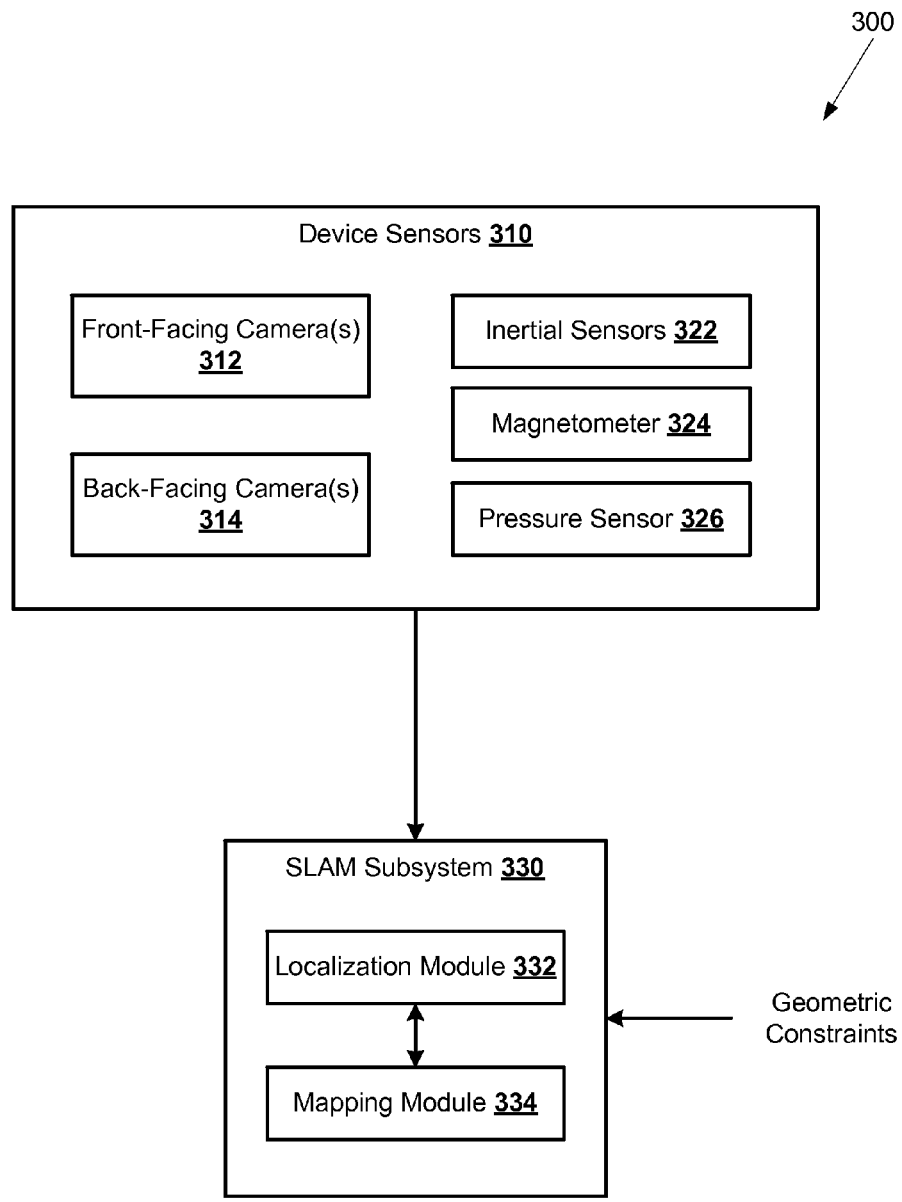
FIG. 3 is a block diagram of a system for simultaneous localization and mapping including a device sensor module.

Referring next to FIG. 3, a block diagram of a system 300 for localization and mapping at a computer system 100 includes one or more device sensors 310 and a SLAM subsystem 330. The sensors 310 include one or more cameras, such as one or more front-facing camera(s) 312 and/or one or more a back-facing camera(s) 314, as well as other sensors such as inertial sensors 322 (e.g., accelerometers, gyroscopes, etc.), a magnetometer 324, a pressure sensor 326, etc. The terms front-facing and back-facing are exemplary only, and not a limitation, as the system 300 may include multiple cameras that are configured such that at least a subset of the multiple cameras can provide non-overlapping views of the environment.

The SLAM subsystem 330 utilizes a plurality of the device sensors 310 for mapping and localization, such as that performed in the context of an AR application. The SLAM subsystem 330 utilizes a localization module 332 and a mapping module 334 that operate on a set of geometric constraints associated with an area. Here, the SLAM subsystem 330 utilizes the device sensors 310 in one or more manners to leverage the geometric constraints and enhance localization and mapping of the associated device. For instance, the use of both front- and back-facing cameras can be utilized to track feature-rich environments, leading to more robust overall tracking. Additionally or alternatively, the inertial sensors 322 and/or other sensors 310 record information about the device, how it is being held, how it is being used and/or moved, etc. This information is then used to provide the incline of the device with respect to vertical to aid in identifying and tracking features. In some embodiments, the SLAM subsystem 330 is implemented in the processor 110 illustrated in FIG. 1 and/or in the working memory 135, for example in the operating system 140 and/or the application 145.

In general, the SLAM subsystem 330 can receive and store geometric constraints that are associated with the expected location of the computer system 100. For example, the geometric constraints for man-made environments (e.g., office buildings, shopping malls, etc.) can include parameters associated with regular structures. Man-made indoor environments typically have rectilinear geometry, with planes that are either parallel or orthogonal. Further, these environments typically have several regular structures, such as rectangles or lines that repeat in patterns. For example, a computer-readable file containing geometric constraint information can be provided to the computer system 100 as a location based service. The geometric constraint information may also be included as part of an application 145 in the working memory 135. Geometric constraint information may include dimensions (e.g., height and width) for architectural features such as walls, doors, windows, columns, and other repeating features. A repeating feature can be overhead joists, or the pattern of a ceiling (e.g., tiles, light fixtures). The dimensions of such regular structure as well as the expected locations of the structural components (e.g. point features) can be used in various algorithms within the SLAM subsystem 330 to aid in mapping and localization. Further, geometric constraint information may include information regarding how planes in the environment are oriented with respect to each other. For example, most floors and walls are perpendicular to each other in an indoor environment, and the angle of walls where two hallways meet may be included. In some environments, such as in an outdoor environment, the expected size or height of various planes might be included in the geometric constraint information. For example, the sides or facade of a building in the outdoor environment might be approximately planar, and the geometric constraint information may indicate whether these planes are likely large (e.g., where there are lots of tall buildings), small (e.g., where there are many short buildings), skinny (e.g., where many buildings are closely spaced together), and/or wide (e.g., where one or more buildings have a large footprint or floor plan). Generally, existing algorithms use point features, which restrict the operating space of these algorithms. To mitigate these restrictions, a plurality of sensors (e.g., two cameras, one or more cameras in combination with other sensors, etc.) are used to leverage this prior knowledge and enforce associated constraints. While examples provided herein generally relate to constraints associated with man-made environments, different environments may be associated with different constraints, and the constraints utilized may vary between environments or within different portions of the same environment.

Figure 4:
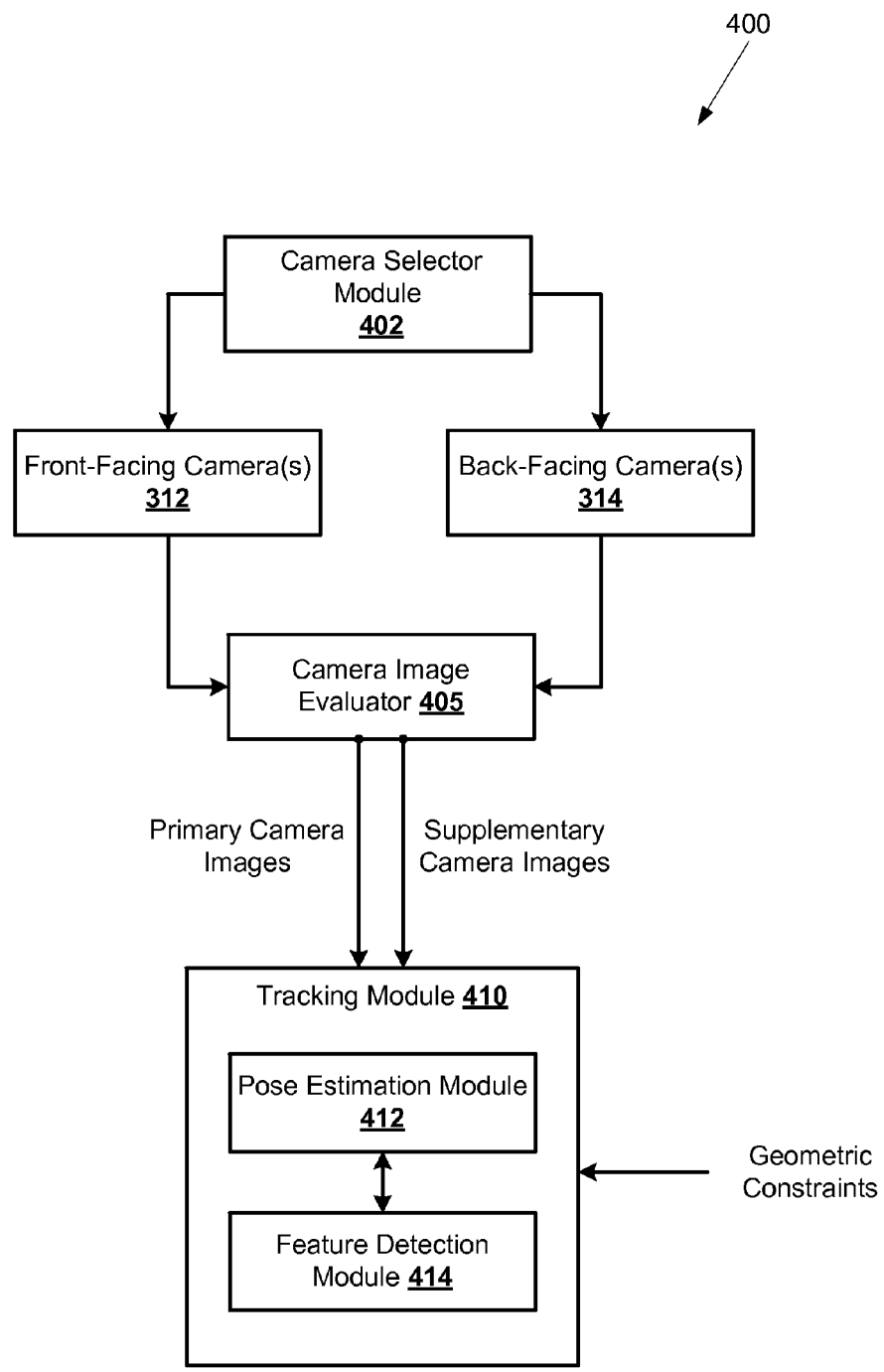
FIG. 4 is a block diagram of a system for simultaneous localization and mapping including front and back facing cameras.
Figure 5:
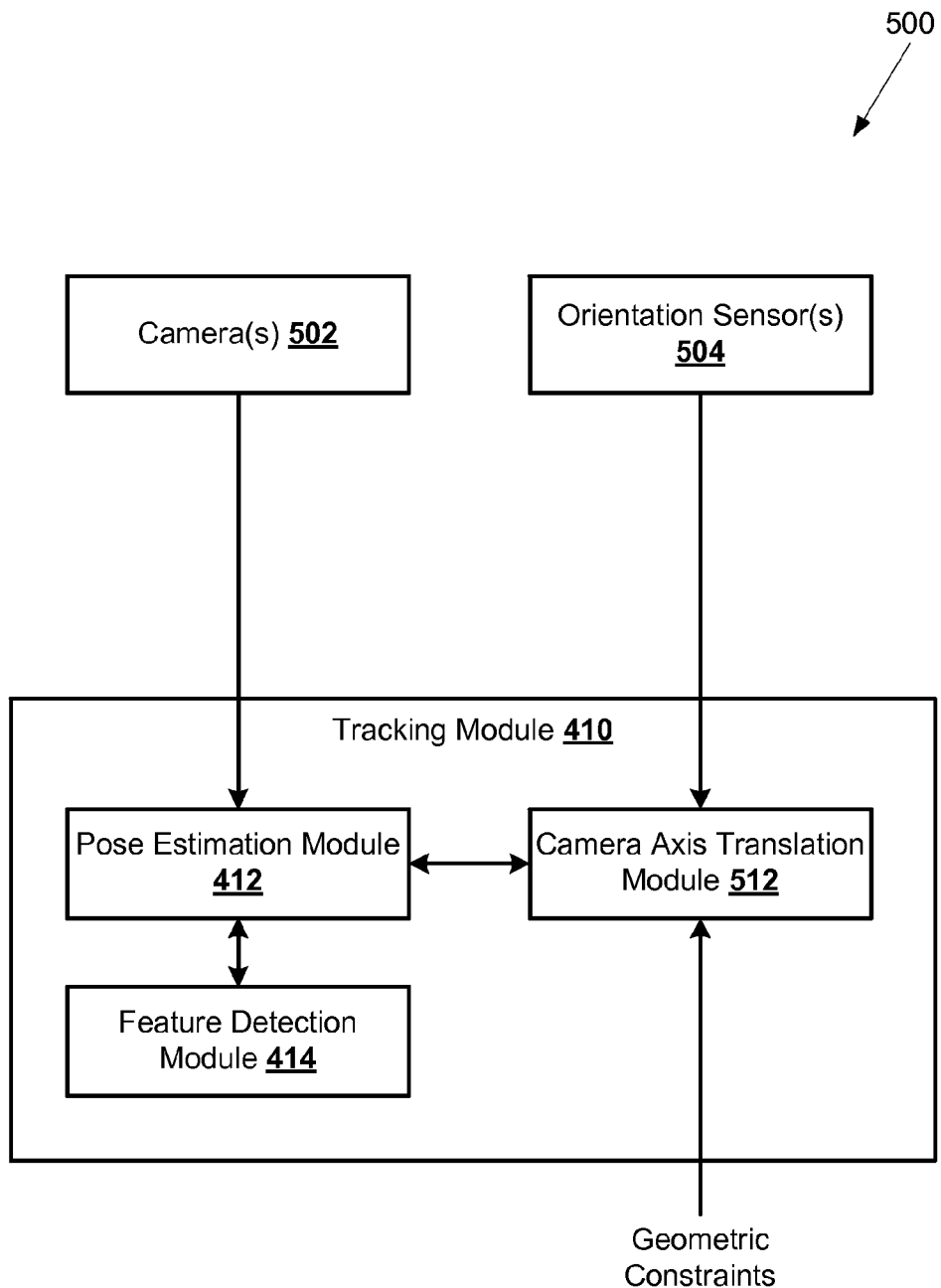
FIG. 5 is a block diagram of a system for simultaneous localization and mapping including a tracking module.

In general, geometric constraints can be utilized by a device to facilitate improved location and mapping using multiple cameras 312, 314, as shown by FIG. 4, one or more cameras 502 and orientation sensors 504, as shown by FIG. 5, or a combination of these approaches. The particular approach chosen may depend on, e.g., the existence and/or type of components available at the device, user preferences, a desired power consumption level, and/or other criteria. The approaches shown in FIGS. 4-5 are described below in further detail.

Referring first to FIG. 4, a system 400 is illustrated for location and mapping of a device having a camera selector module 402, one or more front-facing cameras 312, and one or more back-facing cameras 314. The camera selector module 402 can be configured to identify which camera to use for localization and mapping. The camera selector module may identify multiple cameras to use. The multiple cameras can include one or more front-facing cameras 312, and/or one or more back-facing camera 314, or combinations of both front and back facing cameras 312, 314. The cameras 312, 314 can be configured to cover non-overlapping views of an area. The memory 135 may include an Application Programming Interface (API) configured to allow a developer to program or otherwise configure the camera selector module 402 based on application requirements. For example, if robustness is of higher importance, the camera selector module 402 can be configured to run multiple cameras in order to make the environment creation process faster. In another example, if power conservation is of higher importance, the camera selector module 402 can be configured to run a lesser number of cameras where there is more value for the quality of images.

Images captured by the cameras 312, 314 are analyzed by a camera image evaluator 405, which designates the images captured by the cameras 312, 314 as primary camera images and supplementary camera images based on quality of the images and/or other criteria. These images are provided to a tracking module 410, which utilizes a pose estimation module 412 and a feature detection module 414 to facilitate localization and mapping for a mobile device based on provided geometric constraints associated with a current area. In some embodiments, the tracking module 410 is implemented as a component of the SLAM subsystem 330. The tracking module 410 and the SLAM subsystem 330 may be separately implemented and coupled together, for example in hardware or software. The tracking module 410 may also be implemented in the processor 110 illustrated in FIG. 1 and/or in the working memory 135, e.g., in the operating system 140 and/or the application 145. For example, the tracking module 410 may be implemented in the processor 110 and utilize information received from the SLAM subsystem 330 to track an element within an area or movement of the system 400 in the area so as to provide tracking information or other data to the application 145, which may comprise an AR application.

Images from both the front-facing and back-facing cameras 312, 314 of a moving device provide additional information for tracking. Generally, one of the cameras 312, 314 is facing a feature-rich environment for tracking. The poses from this camera, designated the primary camera by the camera image evaluator 405, can then be used to aid detection of structures imaged by the supplementary camera and to map the environments from both cameras. For rectangles detected by the primary camera, the rectangles detected from the supplementary camera can be assumed to be parallel or perpendicular to cover a substantial portion (e.g., greater than or equal to approximately 95%, or another percentage depending on the particular environment in which the system is used) of geometries.

The tracking module 410 facilitates localization and mapping of a device by identifying and tracking features in an environment at which the device is presently located via computer vision techniques. However, tracking in some instances relies upon an approximately constant flow of features detected within view. If the device loses view of any features, the computer vision algorithm employed by the tracking module 410 may break down, rendering the system 400 unable to track the position of the device. To provide robustness against this case, the system 400 utilizes a plurality of cameras 312, 314 to improve the computer vision performance of the system 400 and increase the ability of the tracking module 410 to exploit properties of the environment to improve localization and mapping performance.

Here, the camera image evaluator 405 identifies primary images and supplementary images by evaluating images captured by the front-facing camera 312 and the back-facing camera 314 to determine which camera is in view of a greater amount of features. However, other techniques for this designation, such as those based on image quality or other metrics, could also be used. This designation may be made at regular or irregular intervals, at time instances based on triggering events, etc. Upon designating primary and supplementary camera images, the primary images are used by the pose estimation module 412 to identify the orientation of the camera based on techniques known in the art. This orientation, along with geometric constraints of the current area provided to the tracking module 410, are utilized by the feature detection module 414 to identify and/or track features detected in the primary images and, as needed, the supplementary images.

Turning next to FIG. 5, another system 500 for location and mapping of a device utilizes a camera 502 and one or more orientation sensors 504 (e.g., inertial sensors 322, magnetometer 324, etc.). The camera 502 and orientation sensors 504 interact with a tracking module 410 that tracks features in view of the camera 502. The tracking module 410 includes a pose estimation module 412 and a feature detection module 414 that function similarly to those illustrated in system 400. Using the camera 502 and the orientation sensors 504, the tracking module 410 can solve for the geometry of the area surrounding the device. However, if only a single camera is presented, the tracking module 410 may lack knowledge relating to the orientation of the camera with respect to the environment. Thus, the tracking module 410 further utilizes a camera axis translation module 512 to identify the orientation of the camera with respect to the environment via the orientation sensors 504 and to utilize this information to enforce geometric constraints on the environment provided to the tracking module, as generally described below.

Environments such as indoor offices typically have numerous horizontal and vertical planar surfaces (i.e., walls, doors, windows, columns), with few surfaces deviating from horizontal or vertical orientation. This assumption can be used as prior knowledge to solve for the geometry of the scene from a camera, for example a monocular camera. For example, instead of solving for the parameters of an arbitrarily oriented plane, the plane can be assumed to be either vertical or horizontal to constrain search.

General examples of geometric constraints include areas with regular structures such as Manhattan World scenes (e.g., the Manhattan world assumption, describing the world based on the Cartesian coordinate system) where lines and planes are aligned along the coordinate axes. Under this assumption, a plane can be fitted to points seen by one camera, and the structures seen by the other camera can be assumed parallel or perpendicular to this plane. Other examples of geometric constraints could specify the geometry of indoor environments using indoor world models. Pursuant to embodiments described herein, such indoor world models may be used to gain an additional advantage with multiple cameras, for example the cameras 312, 314, 502. The tracking module 410 and/or the SLAM subsystem 330 may be configured to solve for the structure of the scene from one camera and pick the model, which may add additional constraints to the models that are applicable for the scene in the other cameras, for example cameras with non-overlapping views. In some embodiments, 3D modeling for the multiple cameras may be linked together using these geometric constraints and may not be performed independently for each camera in some embodiments.

In camera tracking applications, depending on the initialization, the camera coordinate system is typically unknown with respect to coordinate systems defined with respect to the Earth or the environment. As a result, vertical and horizontal structures may end up being inclined in the camera reference frame. Using gravity and the data from the orientation sensors 504, the camera axis translation module can align the z-axis of the camera reference frame to the world frame. Further, with magnetic sensors (e.g., magnetometers 324), the x and y axes can also be aligned. With this alignment, the prior scene geometry information can be used to constrain the search space for the 3D geometry, e.g., by limiting the range at which detection is attempted for surfaces in the 3D space to approximately the horizontal and vertical axes, or by limiting the range for surface detection in other manners appropriate to the properties of the particular environment in which the system 500 is located and its associated constraints. In addition, knowledge of vertical and horizontal surfaces obtained as described above can be used to render realistic augmentations on the camera image, e.g., at a display screen.

Here, system 400 in FIG. 4 and system 500 in FIG. 5 are illustrated and described separately for clarity of description. However, various components of these systems 400, 500 could be used together, e.g., by a common device or set of devices in communication with one another. Thus, while multi-camera and orientation sensor-driven implementations are illustrated separately, a device may use a plurality of cameras in addition to one or more orientation sensors or other sensors.

Figure 6:
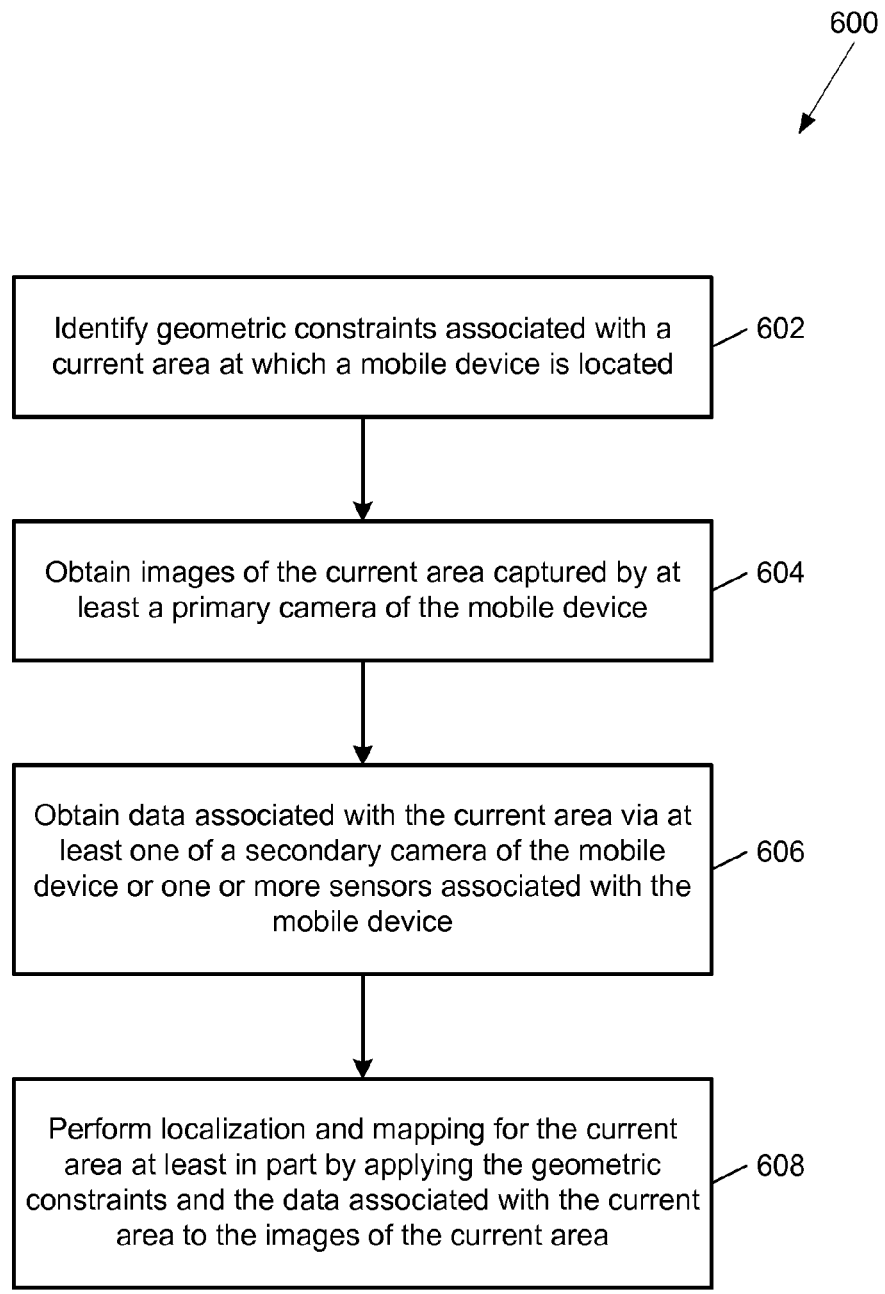
FIG. 6 is a block flow diagram of a process for performing localization and mapping and applying geometric constraints to one or more images of a current area.

Referring to FIG. 6, with further reference to FIGS. 1-5, a process 600 for leveraging geometric constraints and data obtained from multiple sensors to facilitate localization and mapping at a mobile device includes the stages shown. The process 600 is, however, an example only and not limiting. The process 600 can be altered, e.g., by having stages added, removed, rearranged, combined, and/or performed concurrently. Still other alterations to the process 600 as shown and described are possible.

At stage 602, the SLAM subsystem 330 is configured to identify the geometric constraints (a rectilinear geometry associated with an office building, shopping mall or other area, etc.) with a current area at which a device 200 is located. In an embodiment, the geometric constraints are received as a location based service, or are included in the application software. A position determining system (e.g. GPS) operating on the device 200 can be used to identify the geometric constraints (i.e., location specific constraints). A user may also select previously stored constraints (e.g., a library file), or enter new constraints via the display 208.

At stage 604, images of the current area are captured by at least a primary camera of the mobile device. The primary camera may be, e.g., one of the cameras 150, 155, 204, 206, 312, 314 shown in FIGS. 1-3, a designated primary camera 312, 314 as shown in FIG. 4, a camera 502 as shown in FIG. 5, or the like. In an embodiment, the images can include previously captured images that were previously stored in memory 135 (i.e., post-processing).

At stage 606, data associated with the current area are obtained via at least one of a secondary camera of the mobile device, such as a designated secondary camera 312, 314 as shown in FIG. 4, or one or more sensors associated with the mobile device, such as orientation sensors 160 shown in FIG. 1, inertial sensors 322, magnetometer 324 or pressure sensor 326 shown in FIG. 3, orientation sensors 504 shown in FIG. 5, or other suitable sensors. For example, the inertial sensors 322 can be used to detect the orientation of the device 200 (e.g., via gravity), and/or the magnetometer 324 can be used to detect heading (e.g., x/y orientation).

At stage 608, localization and mapping for the current area is performed at least in part by applying the geometric constraints obtained at stage 602 and the data associated with the current area obtained at stage 606 to the images of the current area captured at stage 604. Localization and mapping is performed, e.g., via a SLAM subsystem 330 utilizing a tracking module 410 that operates as generally discussed above. The geometric constraints and data associated with the current area are applied to the images as shown and described above with respect to FIGS. 4-5. In particular, localization and mapping as performed at stage 608 may utilize knowledge that planes are horizontal or vertical (e.g., based on data obtained from orientation sensors or other sensors, a camera pose estimated from images, etc.) or other constraints to process the images of the current area, as opposed to assuming that planes depicted in the images are arbitrarily oriented. Thus, in some embodiments, the images can be searched for planes having an assumed orientation as opposed to attempting to identify planes of any arbitrary orientation. As described above, this knowledge can simplify the localization and mapping in comparison to similar localization and mapping for an environment with arbitrarily oriented features. In an embodiment, the structure in an image obtained from one camera is used to constrain the models that are applicable for the images obtained from other non-overlapping view cameras. Thus, 3D modeling does not have to happen independently for each camera, but the cameras can be linked together using these geometric constraints.

Some or all of the process 600 may be locally performed by a device 200 and/or performed by a remote device, such as a server. For example, while images are captured at stages 604 and/or 606 using cameras at the mobile device, such images may also be captured by another device and processed remotely at a server or another device or received at the mobile device (e.g., via a receiver and/or other means for querying for and/or obtaining data) for local processing. Images captured locally at the mobile device at stages 604 and/or 606 may also be transferred to one or more remote entities for further processing, e.g., at stage 608. Other implementations are also possible.

Figure 7:
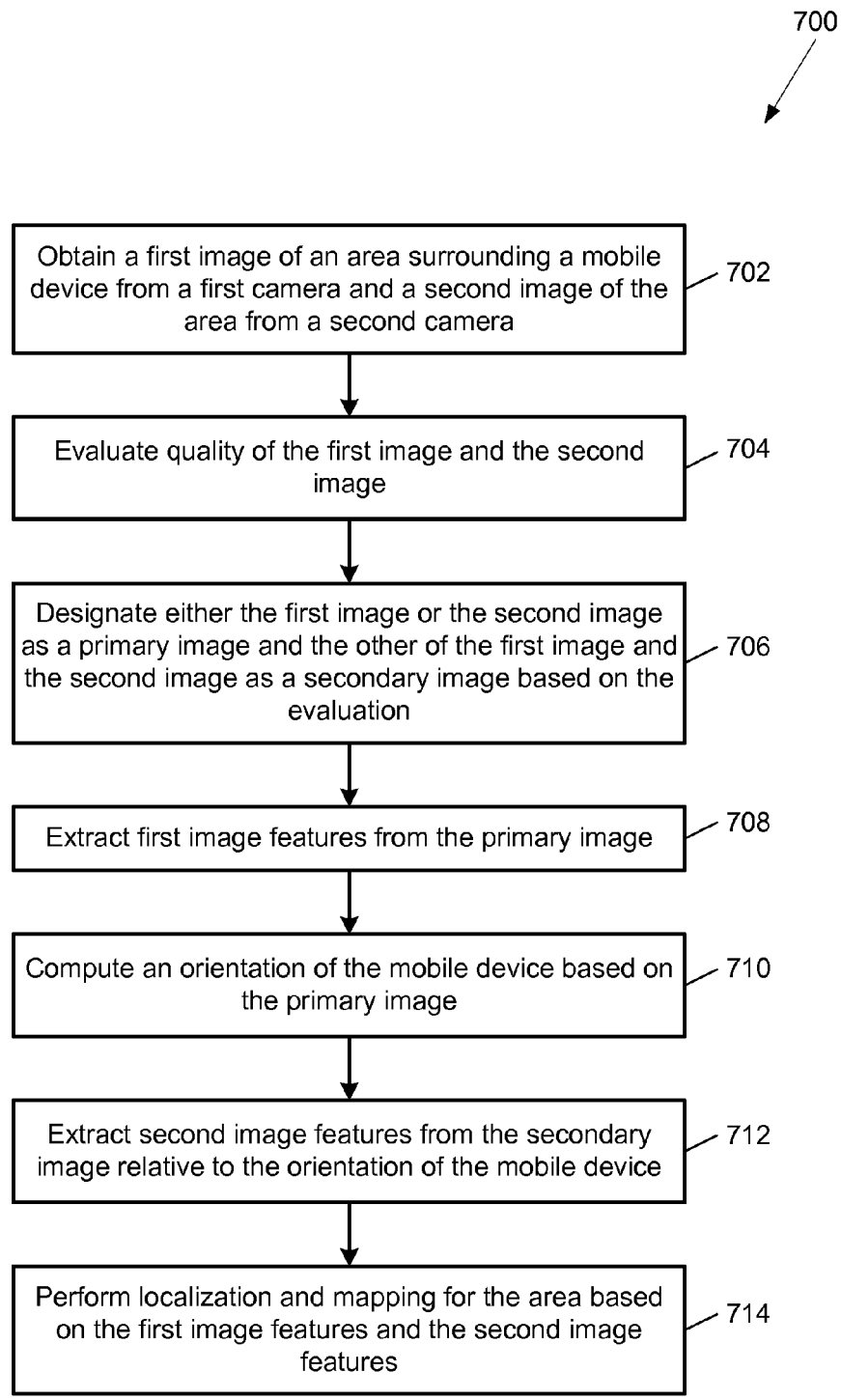
FIG. 7 is a block flow diagram of a process for evaluating two images, extracting features and performing localization and mapping at a mobile device.

Referring to FIG. 7, with further reference to FIGS. 1-5, a process 700 for evaluating two images, extracting features and performing localization and mapping at a mobile device includes the stages shown. The process 700 is, however, an example only and not limiting. The process 700 can be altered, e.g., by having stages added, removed, rearranged, combined, and/or performed concurrently. Still other alterations to the process 700 as shown and described are possible. In addition, process 700 can be used to identify horizontal and vertical surfaces that are seen by the camera to render appropriate augmentations at a display screen, as described above. The process 700 can be used to evaluate multiple images.

At stage 702, a first image of an area surrounding a mobile device is obtained from a first camera of the mobile device, and a second image of the area is obtained from a second camera of the mobile device. The first and second images are exemplary only, and not a limitation, as the process 700 may be configured to obtain and process more than two images. In some embodiments, the more than two images are received from more than two respective cameras. The images may be obtained from the one or more front-facing cameras 312, and/or the one or more back-facing cameras 314. In an embodiment, the cameras are oriented in different directions and can capture different images (e.g., different field of views) of an environment. For example, if one camera is obstructed or otherwise providing a degraded image due to factors such as lighting, orientation, the second camera may have a clear view of the scene.

At stage 704, quality of the first image and the second image obtained at stage 702 is evaluated. Here, this evaluation is performed by a camera image evaluator 405 based on features within the images, quality of the images, or other criteria. In an embodiment the resolution of the image can be used to determine the quality of the image. The quality of the images can be based on the quantity and detectability of scene features. As examples, and not limitations, an image that is out of focus, or suffers from improper exposure (i.e., over or under exposed), or lacks contrast may be of lower quality because the scene features may be obscured. Other imperfections in the image capture process may also reduce the quality of an image such as an obstructed view, or a general lack of features in the image.

At stage 706, either the first image or the second image is designated as a primary image, and the other of the first image and the second image is designated as a secondary image based on the evaluation at stage 704. For example, the image with a higher quality will be designated as the primary image. The higher quality image may include more detectable features, or patterns, that can be recognized by the camera image evaluator 405.

At stage 708, first image features are extracted from the primary image, e.g., by a feature detection module 414 associated with a tracking module 410. The features are generally associated with the received geometric constraints. For example, the features can be detectable architectural features such walls, doors, columns or other man-made patterns (e.g., ceiling tiles, light fixtures, door signs).

At stage 710, an orientation of the mobile device is computed, e.g., by a pose estimation module 412, based on the primary image. For example, the pose estimation module 412 applies the received geometric constraint information to determine the orientation of the device 200. For example, the orientation of a wall, or ceiling tiles, or light fixtures can be disposed a previously known bearing and the pose estimation module 412 can be configured to determine a corresponding orientation vector based on the known bearing of the features.

At stage 712, second image features are extracted from the secondary image relative to the orientation of the mobile device as determined at stage 710. The feature detection module 414 and the associated tracking module 410 can function as previously described with the primary image. In an embodiment, a weighting function can be applied to the secondary image based on the quality of the image. For example, the feature detection may be degraded due to a low quality image. In this example, the results of the feature detection using the secondary image may not correlate with the results obtained via the primary image. The weighting function can be used to diminish, or ignore, the results obtained via the secondary image in an effort not to degrade the overall orientation computation. The geometric constraints may be used to select or combine elements from the primary and secondary images. For example, given the location of two or more cameras relative to each other, the features from a good image obtained from one camera can be equated with the features captured by the other camera based on the known geometry of the environment as provided in the geometric constraints.

At stage 714, localization and mapping are performed for the mobile device relative to the area based on the first image features extracted at stage 708 and the second image features extracted at stage 712. Here, the operations at stage 714 are performed by a SLAM subsystem 330 with assistance from the tracking module 410 and its associated components.

Similar to the process 600, some or all of the process 700 may be locally performed by a device 200 and/or remotely performed by a server or other remote device. For example, while images are captured at stage 702 using cameras at the mobile device, such images may also be captured by another device and processed remotely at a server or another device or received at the mobile device (e.g., via a receiver and/or other means for querying for and/or obtaining data) for local processing. Images captured locally at the mobile device at stage 702 may also be transferred to one or more remote entities for further processing, e.g., at stages 706, 708, 712, 714. Other implementations are also possible.

Figure 8:
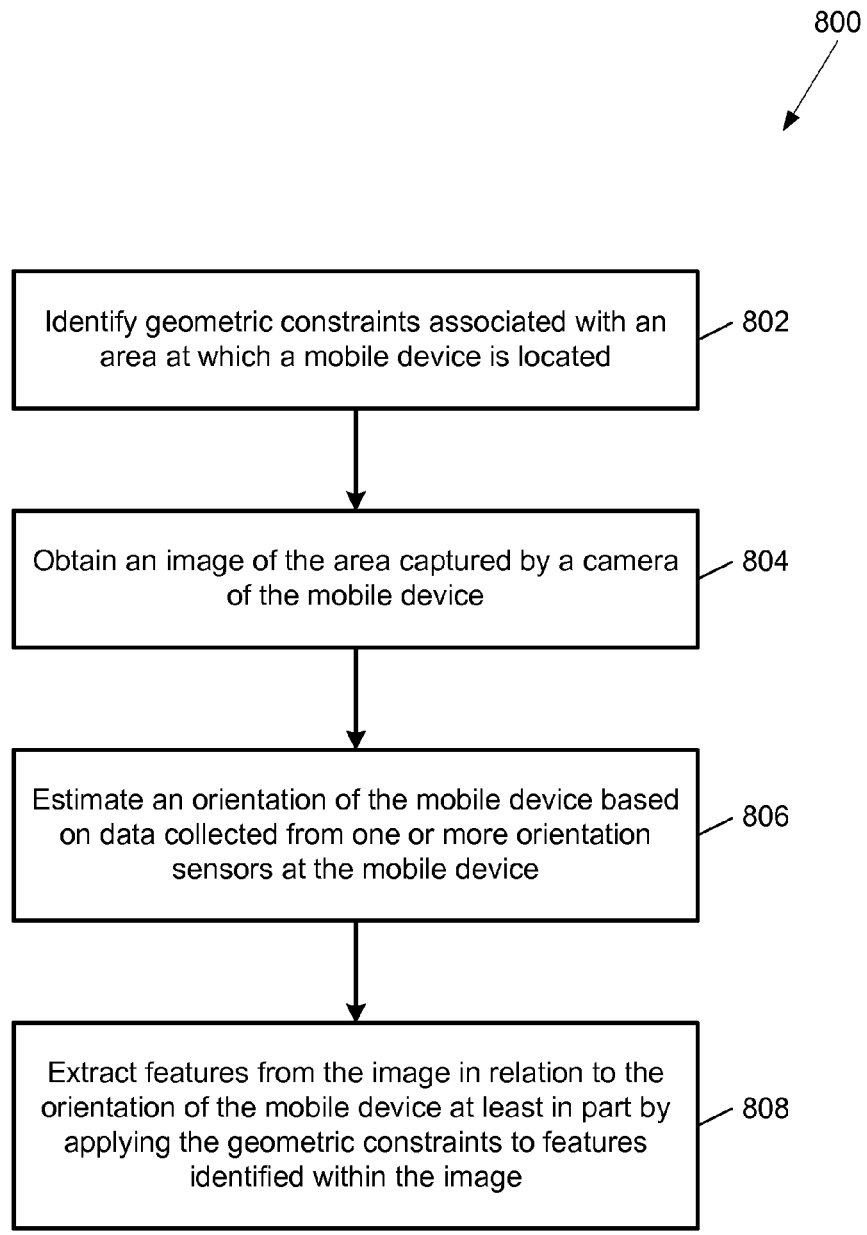
FIG. 8 is a block flow diagram of a process for extracting features of an image captured by a mobile device based on orientation and geometric constraints.

Referring to FIG. 8, with further reference to FIGS. 1-5, a process 800 for extracting features of an image captured by a mobile device based on orientation and geometric constraints includes the stages shown. The process 800 is, however, an example only and not limiting. The process 800 can be altered, e.g., by having stages added, removed, rearranged, combined, and/or performed concurrently. Still other alterations to the process 800 as shown and described are possible.

At stage 802, geometric constraints associated with an area at which a mobile device is located are identified. As described above, these constraints may include a rectilinear geometry or other patterns associated with an office building, shopping mall or other area, etc. The geometric constraints can be provided as a location based service (i.e., based on the current location of the device 200), or as part of an application stored in memory.

At stage 804, an image of the area is captured by a camera 502 of the mobile device.

At stage 806, an orientation of the mobile device (e.g., with respect to gravity, with respect to the environment, etc.) is estimated by a pose estimation module 412 or other means based on data collected from one or more orientation sensors 504 at the mobile device.

At stage 808, features are extracted from the image captured at stage 804 in relation to the orientation of the mobile device as estimated at stage 806 at least in part by applying the geometric constraints identified at stage 802 to features identified within the image. The operations shown at stage 808 are performed by, e.g., a feature detection module 414 or other suitable means. Upon extraction of features, the orientation sensors 504, the geometric constraints identified at stage 802, and/or other means may be used to map and/or track extracted features through an associated environment. Further, as described above, identified horizontal and vertical surfaces can be used to render realistic augmentations on a display of an image or live camera view. As an example, such augmentations could include characters resting on horizontal surfaces or climbing on vertical surfaces. Any other suitable augmentations could also be used.

Similar to the processes 600, 700, some or all of the process 800 may be locally performed by a device 200 and/or remotely performed by a server or other remote device. For example, while an image is captured at stage 804 using a camera at the mobile device, the image may also be captured by another device and processed remotely at a server or another device or received at the mobile device (e.g., via a receiver and/or other means for querying for and/or obtaining data) for local processing. An image captured locally at the mobile device at stage 804 may also be transferred to one or more remote entities for further processing, e.g., at stage 808. Other implementations are also possible.

Further, while processes 600, 700, and 800 are illustrated and described separately for clarity of description, various elements, functions, steps, and/or stages of these processes may be used together, e.g., by in a combined procedure or at a common device or set of devices in communication with one another. Thus, each of the stages illustrated or described with respect to processes 600, 700, and 800 may be implemented in either of the other processes.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of performing localization and mapping with a mobile device, the method comprising:
   identifying geometric constraints associated with a current area at which the mobile device is located, wherein the geometric constraints comprise a rectilinear geometry associated with the current area and include constraints on dimensions and/or orientations of first real-world geometric planes;
   obtaining a first image of the current area captured by a first camera of the mobile device;
   obtaining a second image of the current area captured by a second camera of the mobile device, a field of view of the first image being non-overlapping with a field of view of the second image;
   obtaining, from the second image of the current area captured by the second camera, geometry information associated with second real-world geometric planes in the second image of the current area captured by the second camera; and performing the localization and mapping for the current area at least in part by constraining orientations of the first real-world geometric planes in the first image of the current area captured by the first camera based on the geometry information associated with the second real-world geometric planes in the second image of the current area captured by the second camera and based on the geometric constraints associated with the current area, wherein constraining the orientations of the real-world geometric planes comprises processing the first image of the current area using a model that constrains the orientations of the real-world geometric planes in the first image to be parallel or perpendicular to the real-world geometric planes in the second image.

2. The method of claim 1 further comprising:
evaluating the first image and the second image; and
designating the first image as a primary image and the second image as a secondary image based on the evaluating.

3. The method of claim 2 further comprising computing a pose of the mobile device relative to an environment in which the mobile device is located based on the primary image or at least one other image captured via the first camera.

4. The method of claim 3 wherein performing the localization and mapping comprises:
extracting first image features from the primary image;
extracting second image features from the secondary image using the pose of the mobile device relative to the environment in which the mobile device is located; and
performing the localization and mapping for the current area based on the first image features and the second image features.

5. The method of claim 2 wherein the evaluating comprises evaluating the first image and the second image with respect to at least one of features within the first image and the second image or image quality of the first image and the second image.

6. The method of claim 1 wherein the first camera faces a first direction and the second camera faces a second direction that is different from the first direction.

7. The method of claim 1 further comprising collecting orientation data from an orientation sensor at the mobile device, and wherein performing the localization and mapping comprises obtaining an estimated orientation of the mobile device based on the orientation data collected from the orientation sensor.

8. The method of claim 7 wherein performing the localization and mapping further comprises extracting features from the first image in relation to the estimated orientation of the mobile device by applying the geometric constraints to the features extracted from the first image.

9. The method of claim 8 further comprising performing at least one of mapping or tracking of the features extracted from the first image based on the geometric constraints and the estimated orientation of the mobile device.

10. The method of claim 7 further comprising:
identifying surfaces within the first image based on the geometric constraints and the estimated orientation of the mobile device, the surfaces comprising at least one of horizontal surfaces or vertical surfaces;
rendering the first image for display on a display screen; and
rendering an augmentation on the display screen over at least one of the surfaces identified within the first image.

11. The method of claim 1 wherein the geometric constraints include a location of a wall.

12. A mobile device operable to perform localization and mapping, the mobile device comprising:
a first camera configured to capture a first image of the current area;
a second camera configured to obtain a second image of the current area, a field of view of the first image being non-overlapping with a field of view of the second image;
a processor configured to:
identify geometric constraints associated with a current area at which the mobile device is located, wherein the geometric constraints comprise a rectilinear geometry associated with the current area and include constraints on dimensions and/or orientations of first real-world geometric planes; and
obtain, from the second image of the current area captured by the second camera, geometry information associated with second real-world geometric planes in the second image of the current area captured by the second camera; and
a simultaneous localization and mapping (SLAM) subsystem configured to perform the localization and mapping for the current area at least in part by constraining orientations of the first real-world geometric planes in the first image of the current area captured by the first camera based on the geometry information associated with the second real-world geometric planes in the second image of the current area captured by the second camera and based on the geometric constraints associated with the current area, wherein the SLAM subsystem is configured to process the first image of the current area using a model that constrains the orientations of the real-world geometric planes in the first image to be parallel or perpendicular to the real-world geometric planes in the second image.

13. The mobile device of claim 12 further comprising a camera image evaluator communicatively coupled to the first camera and the second camera and configured to evaluate the first image and the second image and to designate the first image as a primary image and the second image as a secondary image based on the evaluation.

14. The mobile device of claim 13 wherein the processor is further configured to compute a pose of the mobile device relative to an environment in which the mobile device is located based on the primary image or at least one other image captured via the first camera.

15. The mobile device of claim 14 wherein the SLAM subsystem is further configured to extract first image features from the primary image, to extract second image features from the secondary image using the pose of the mobile device relative to the environment in which the mobile device is located, and to perform the localization and mapping for the current area based on the first image features and the second image features.

16. The mobile device of claim 13 wherein the camera image evaluator is further configured to evaluate the first image and the second image with respect to at least one of features within the first image and the second image or image quality of the first image and the second image.

17. The mobile device of claim 12 wherein the first camera faces a first direction and the second camera faces a second direction that is different from the first direction.

18. The mobile device of claim 12 further comprising an orientation sensor configured to generate data relating to an orientation of the mobile device, and wherein the processor is further configured to estimate the orientation of the mobile device based on the data generated by the orientation sensor.

19. The mobile device of claim 18 wherein the SLAM subsystem is configured to extract features from the first image in relation to the estimated orientation of the mobile device at least in part by applying the geometric constraints to the features extracted from the first image.

20. The mobile device of claim 18 wherein:
the SLAM subsystem is further configured to identify surfaces within the first image based on the geometric constraints and the estimated orientation of the mobile device, the surfaces comprising at least one of horizontal surfaces or vertical surfaces; and
the mobile device further comprises a display screen and a graphics processor configured to render the first image for display on the display screen and to render an augmentation on the display screen over at least one of the surfaces identified within the first image.

21. The mobile device of claim 12 wherein the geometric constraints include at least a location of a wall.

22. An apparatus that facilitates performing localization and mapping with a mobile device, the apparatus comprising:
means for identifying geometric constraints associated with a current area at which the mobile device is located, wherein the geometric constraints comprise a rectilinear geometry associated with the current area and include constraints on dimensions and/or orientations of first real-world geometric planes;
means for obtaining a first image of the current area captured by a first camera of the mobile device;
means for obtaining a second image of the current area captured by a second camera of the mobile device, a field of view of the first image being non-overlapping with a field of view of the second image;
means for obtaining, from the second image of the current area captured by the second camera, geometry information associated with second real-world geometric planes in the second image of the current area captured by the second camera; and
means for performing the localization and mapping for the current area at least in part by constraining orientations of the first real-world geometric planes in the first image of the current area captured by the first camera based on the geometry information associated with the second real-world geometric planes in the second image of the current area captured by the second camera and based on the geometric constraints associated with the current area, wherein the means for constraining the orientations of the real-world geometric planes comprises means for processing the first image of the current area using a model that constrains the orientations of the real-world geometric planes in the first image to be parallel or perpendicular to the real-world geometric planes in the second image.

23. The apparatus of claim 22 further comprising:
means for evaluating the first image and the second image; and
means for designating the first image as a primary image and the second image as a secondary image based on the evaluating.

24. The apparatus of claim 23 further comprising means for computing a pose of the mobile device relative to an environment in which the mobile device is located based on the primary image or at least one other image captured via the first camera.

25. The apparatus of claim 24 wherein the means for performing the localization and mapping comprises:
means for extracting first image features from the primary image;
means for extracting second image features from the secondary image using the pose of the mobile device relative to the environment in which the mobile device is located; and
means for performing the localization and mapping for the current area based on the first image features and the second image features.

26. The apparatus of claim 23 wherein the means for evaluating the first image and the second image comprises means for evaluating the first image and the second image with respect to at least one of features within the first image and the second image or image quality of the first image and the second image.

27. The apparatus of claim 22 wherein the first camera faces a first direction and the second camera faces a second direction that is different from the first direction.

28. The apparatus of claim 22 further comprising means for collecting data from an orientation sensor at the mobile device, and wherein the means for performing the localization and mapping comprises means for estimating an orientation of the mobile device based on the data collected from the orientation sensor.

29. The apparatus of claim 28 wherein the means for performing the localization and mapping further comprises means for extracting features from the first image in relation to the estimated orientation of the mobile device by applying the geometric constraints to the features extracted from the first image.

30. The apparatus of claim 28 further comprising:
means for identifying surfaces within the first image based on the geometric constraints and the estimated orientation of the mobile device, the surfaces comprising at least one of horizontal surfaces or vertical surfaces;
means for rendering the first image for display on a display screen; and
means for rendering an augmentation on the display screen over at least one of the surfaces identified within the first image.

31. The apparatus of claim 22 wherein the geometric constraints include a location of a wall.

32. A non-transitory computer storage medium comprising processor-executable instructions configured to cause a processor to:
identify geometric constraints associated with a current area at which a mobile device is located, wherein the geometric constraints comprise a rectilinear geometry associated with the current area and include constraints on dimensions and/or orientations of first real-world geometric planes;
obtain a first image of the current area captured by a first camera of the mobile device;
obtain a second image of the current area captured by a second camera of the mobile device, a field of view of the first image being non-overlapping with a field of view of the second image;
obtain, from the second image of the current area captured by the second camera, geometry information associated with second real-world geometric planes in the second image of the current area captured by the second camera; and
perform localization and mapping for the current area at least in part by constraining orientations of the first real-world geometric planes in the first image of the current area captured by the first camera based on the geometry information associated with the second real-world geometric planes in the second image of the current area captured by the second camera and based on the geometric constraints associated with the current area, wherein constraining the orientations of the real-world geometric planes comprises processing the first image of the current area using a model that constrains the orientations of the real-world geometric planes in the first image to be parallel or perpendicular to the real-world geometric planes in the second image.

\* \* \* \* \*